United States Patent [19]

Spencer

[11] Patent Number: 4,682,457

[45] Date of Patent: Jul. 28, 1987

[54] OPEN OFFICE LANDSCAPE SYSTEM

[76] Inventor: Richard O. Spencer, 18 Viejo, Irvine, Calif. 92714

[21] Appl. No.: 766,099

[22] Filed: Aug. 15, 1985

[51] Int. Cl.⁴ .............................................. E04H 1/00
[52] U.S. Cl. ..................................... 52/239; 52/221; 52/779
[58] Field of Search ................ 52/239, 238.1, 36, 220, 52/221, 241, 242, 779

[56] References Cited

U.S. PATENT DOCUMENTS

| | | | |
|---|---|---|---|
| 3,194,361 | 7/1965 | Thurman | 52/239 X |
| 3,195,698 | 7/1965 | Codrea | 52/239 X |
| 3,261,625 | 7/1966 | Cripe | 287/189.36 |
| 3,276,175 | 10/1966 | Birum, Jr. | 52/809 |
| 3,282,006 | 11/1966 | Halsey et al. | 52/239 X |
| 3,486,287 | 12/1969 | Guillon | 52/495 |
| 3,745,732 | 7/1973 | Pritchard et al. | 52/239 |
| 3,762,116 | 10/1973 | Anderson et al. | 52/239 |
| 3,788,378 | 1/1974 | Sobel | 160/135 |
| 3,809,142 | 5/1974 | Bleeker | 160/135 |
| 3,871,153 | 3/1975 | Birum, Jr. | 52/809 |
| 3,978,631 | 9/1976 | Diersing | 52/239 |
| 3,999,342 | 12/1976 | Kaulfuss et al. | 52/239 |
| 4,060,294 | 11/1977 | Haworth et al. | 52/239 X |
| 4,104,837 | 8/1978 | Naito | 52/173 R |
| 4,112,643 | 9/1978 | Decker | 52/222 |
| 4,185,422 | 1/1980 | Radek | 52/36 |
| 4,185,430 | 1/1980 | Gartung | 52/285 |
| 4,231,630 | 11/1980 | Propst et al. | 339/22 R |
| 4,239,932 | 12/1980 | Textoris et al. | 174/48 |
| 4,242,970 | 1/1981 | Suttles et al. | 108/159 |
| 4,269,005 | 5/1981 | Timmons | 52/239 X |
| 4,270,020 | 5/1981 | Kenworthy et al. | 52/239 |
| 4,296,579 | 10/1981 | Proud | 52/239 |
| 4,334,374 | 6/1982 | Spamer et al. | 40/606 |
| 4,446,663 | 5/1984 | Stumpf et al. | 52/239 X |

FOREIGN PATENT DOCUMENTS 560679  9/1957  Belgium .................. 52/239

Primary Examiner—Carl D. Friedman
Assistant Examiner—Naoko M. Slack
Attorney, Agent, or Firm—Knobbe, Martens, Olson & Bear

[57] ABSTRACT

A modular building structure having a separately leveled base and individually connected modular panels is provided. The panel receiving base is interconnected and leveled prior to placing the individual modular panels therein. The modular panels are constructed from horizontal and vertical channels so designed as to create internal electrical and communication raceways within the partition wall upon connection of the modular panels. The outer surface of the partition is readily replaceable by removing snap-fit attached outer skins from the modular units. The removable skins provide ready access to the internal electrical and communication pathways and enable the rapid repair or replacement of the outer paritition covering.

8 Claims, 32 Drawing Figures

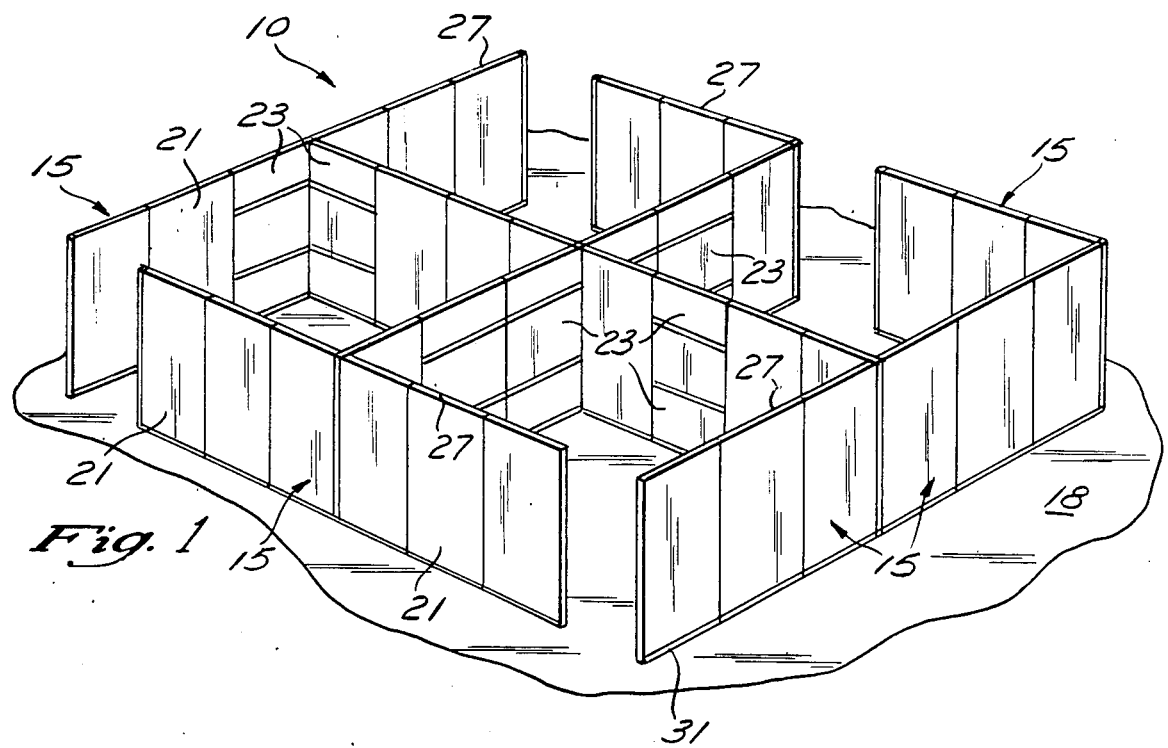
Fig. 1
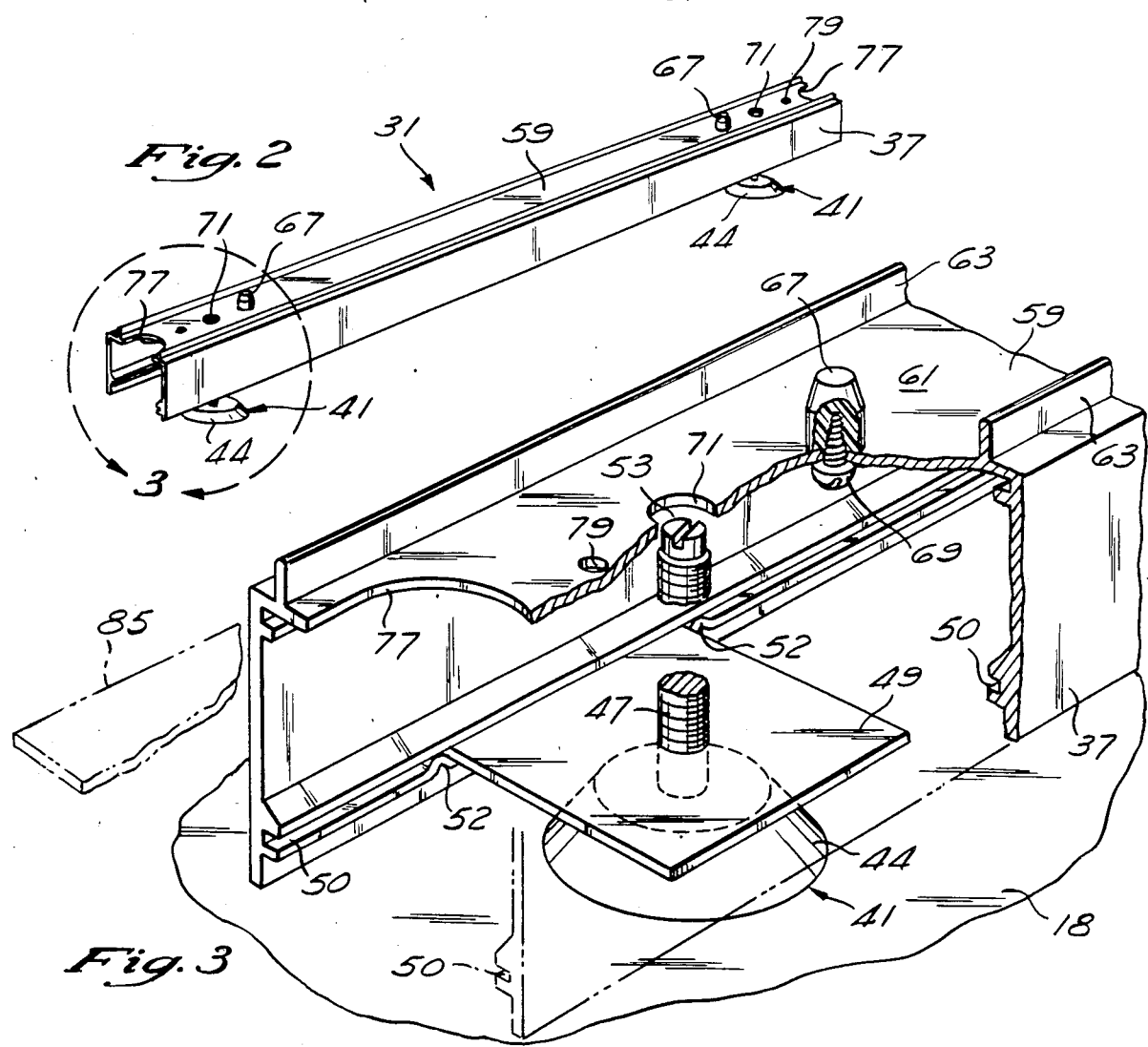
Fig. 2
Fig. 3

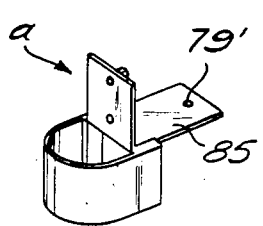
Fig. 4a
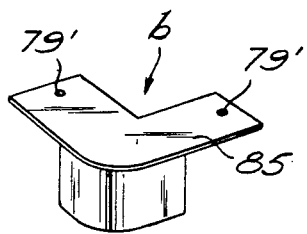
Fig. 4b
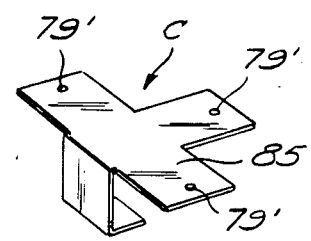
Fig. 4c
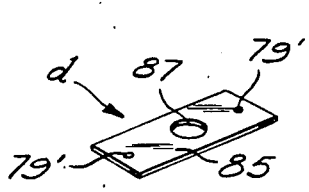
Fig. 4d
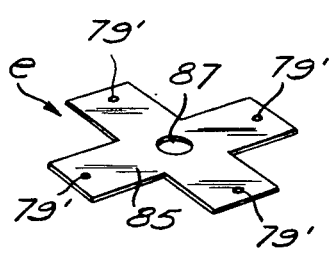
Fig. 4e
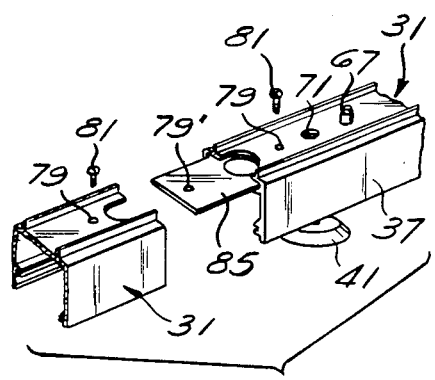
Fig. 5
Fig. 6
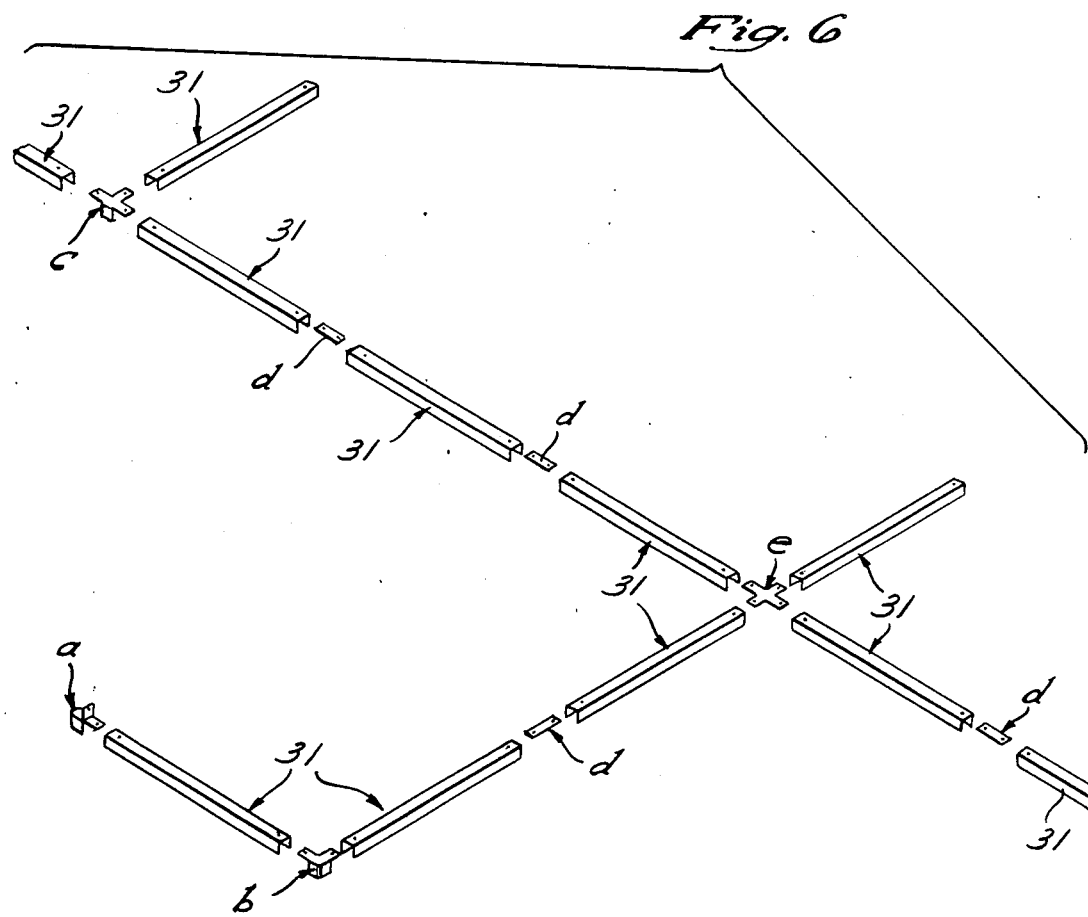

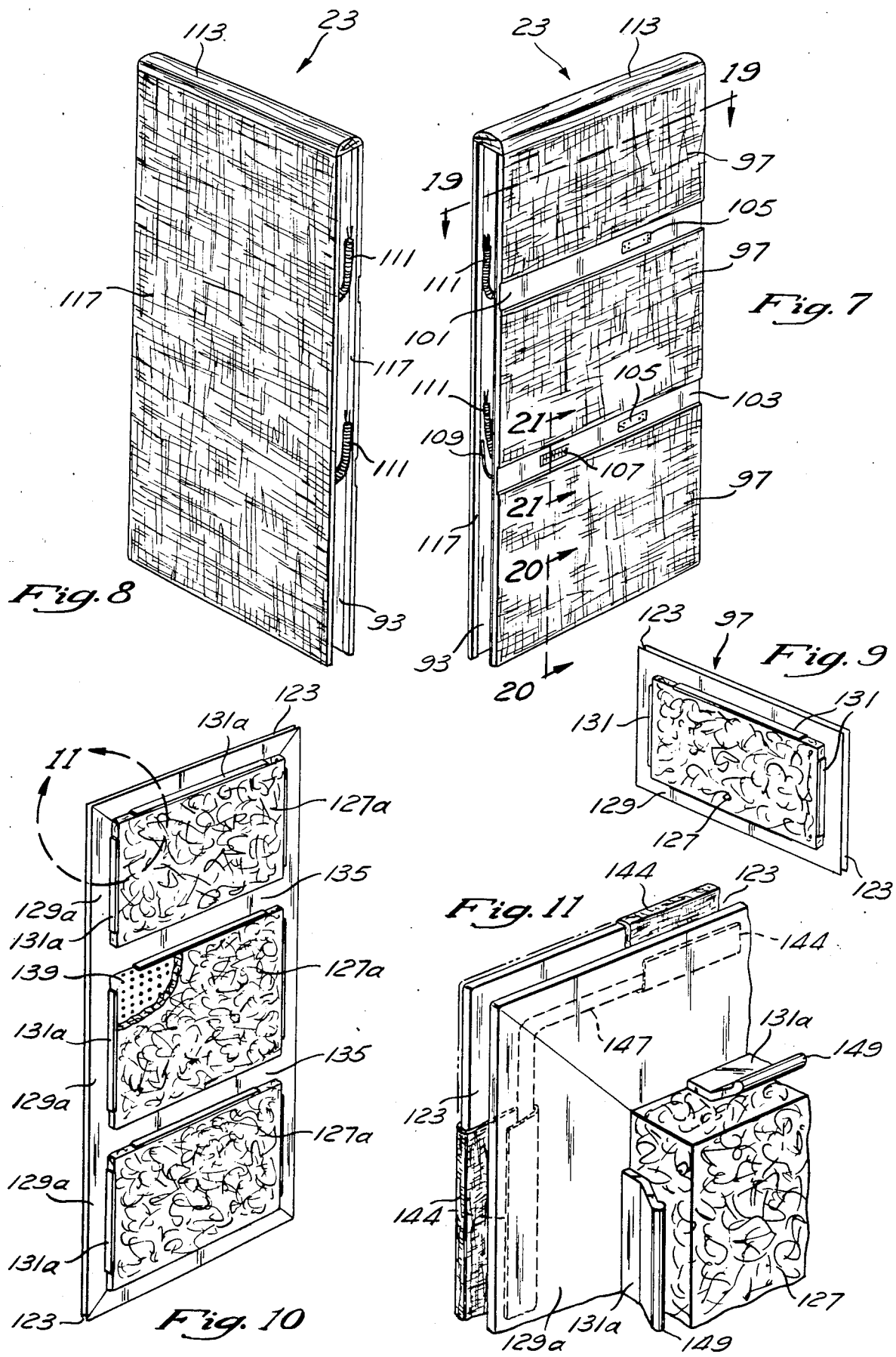

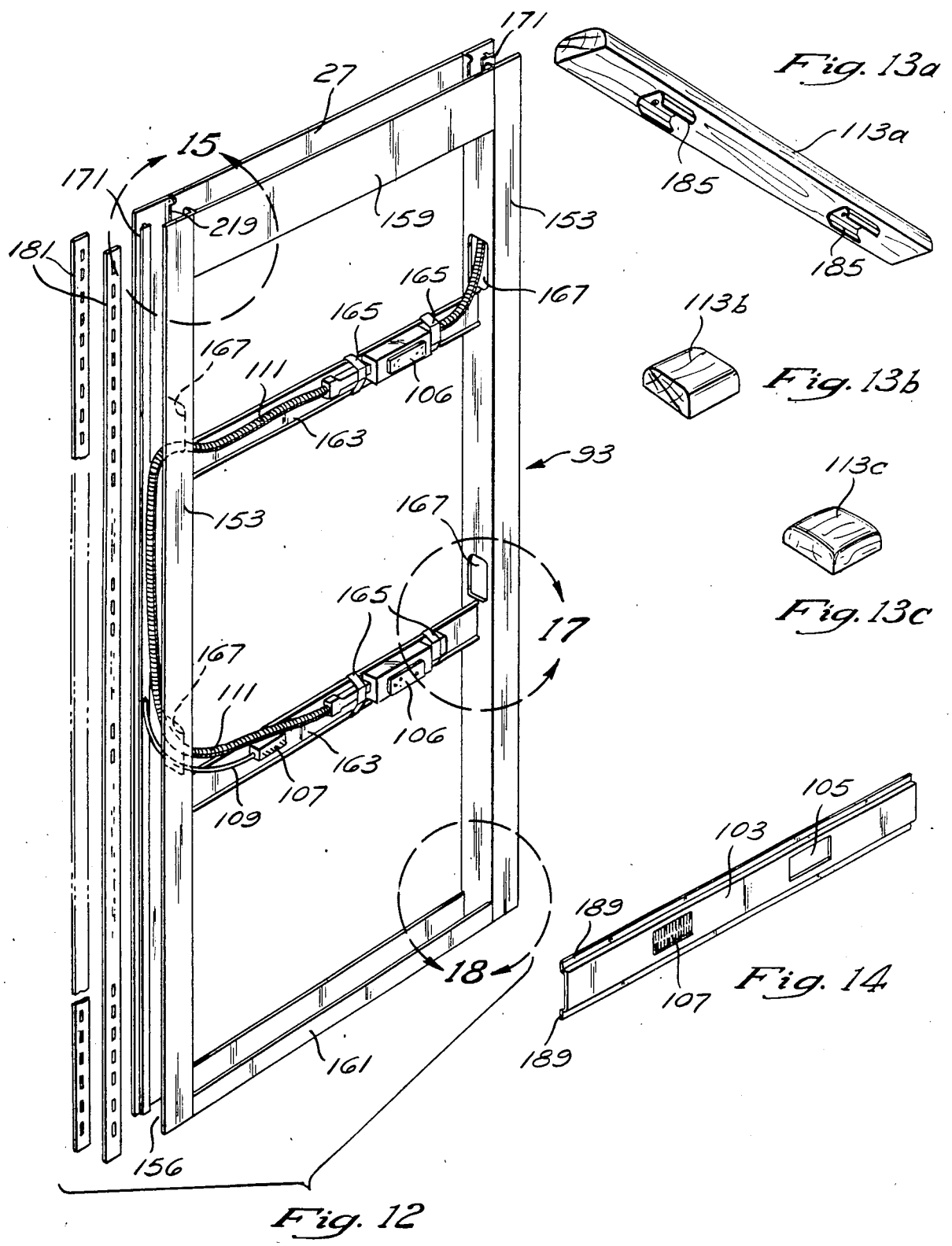

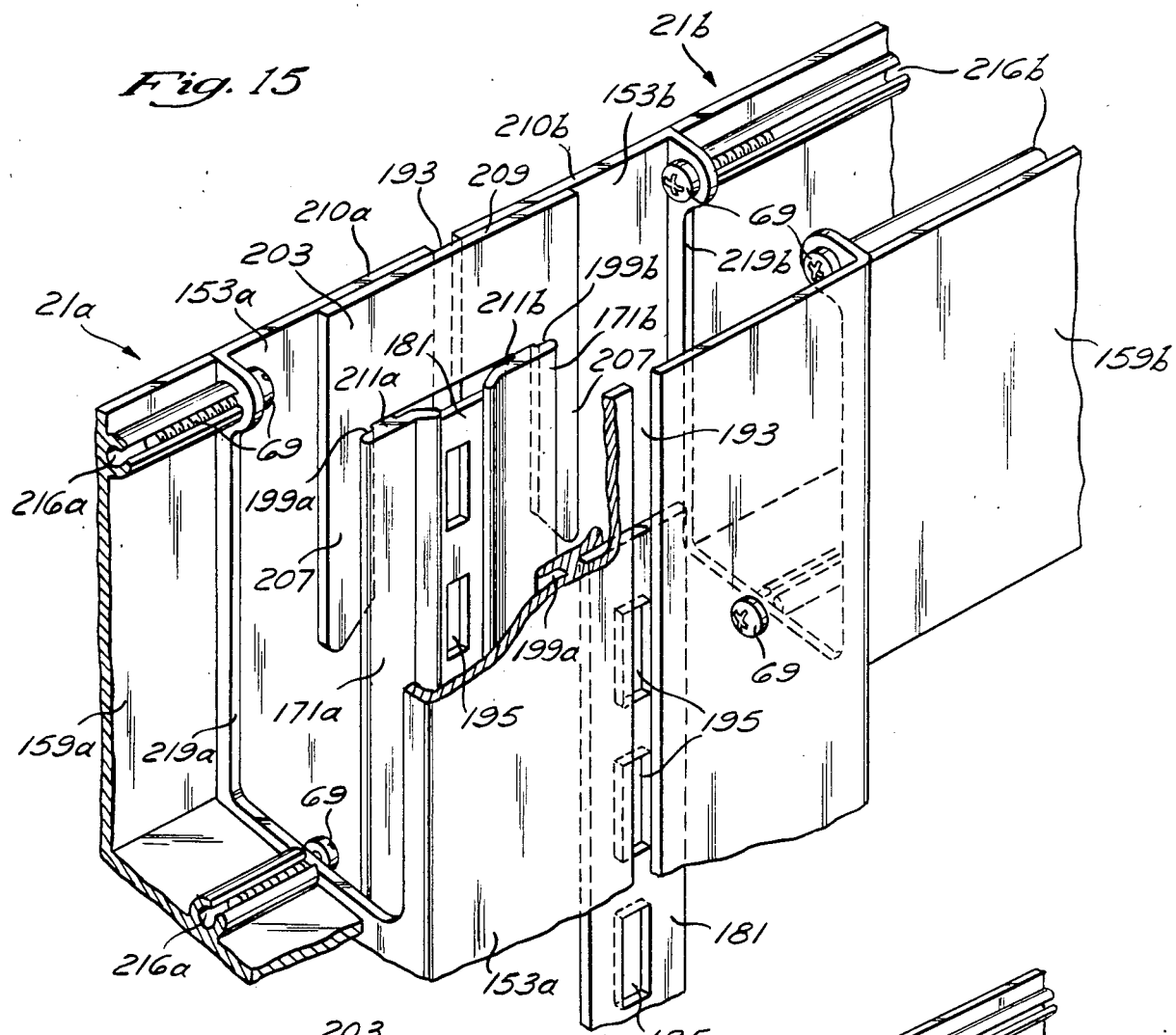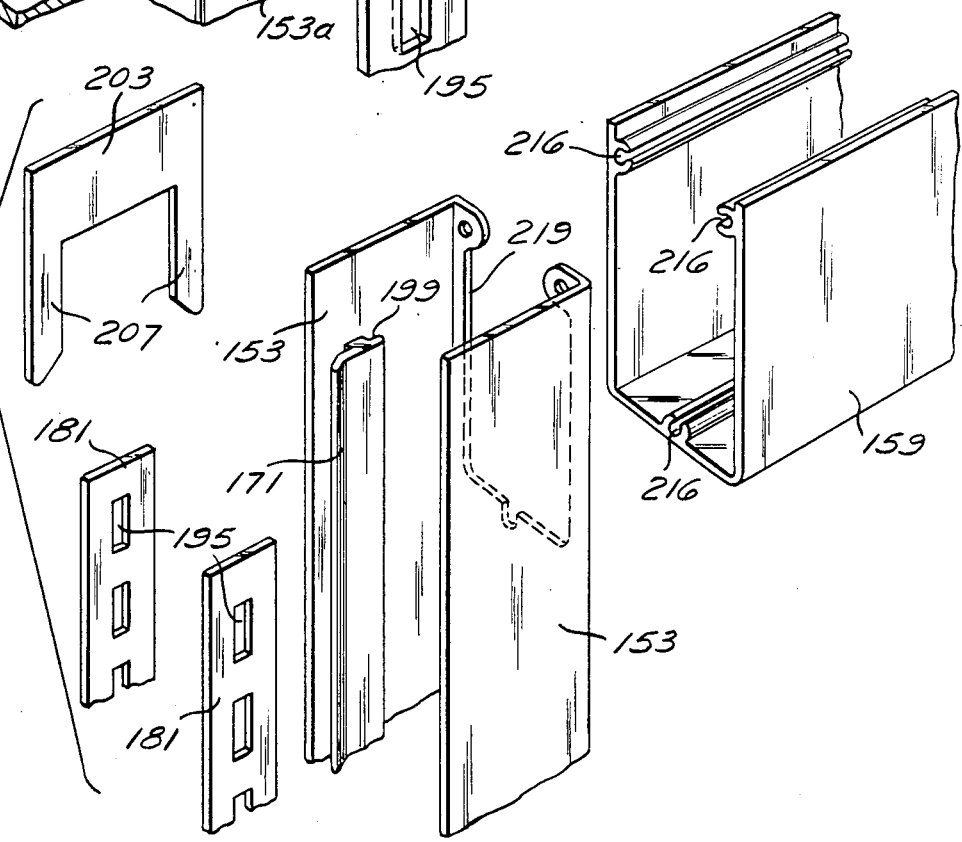

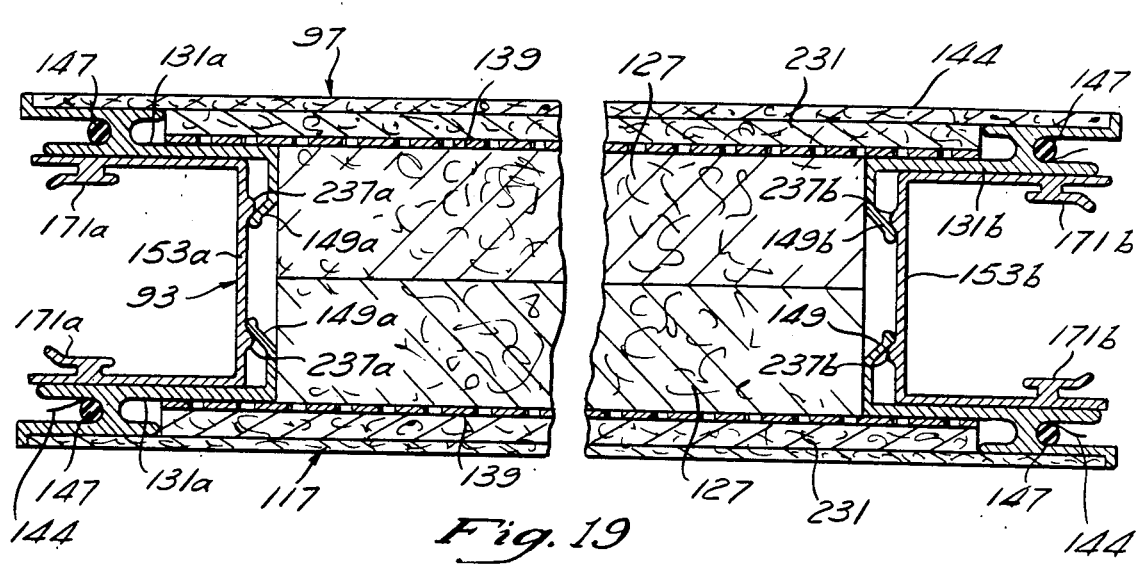
Fig. 19
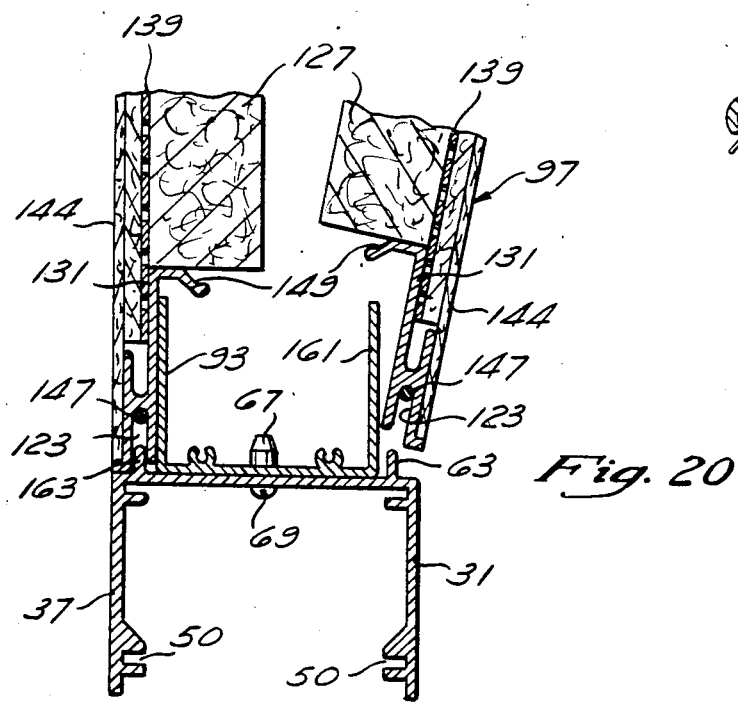
Fig. 21
Fig. 20

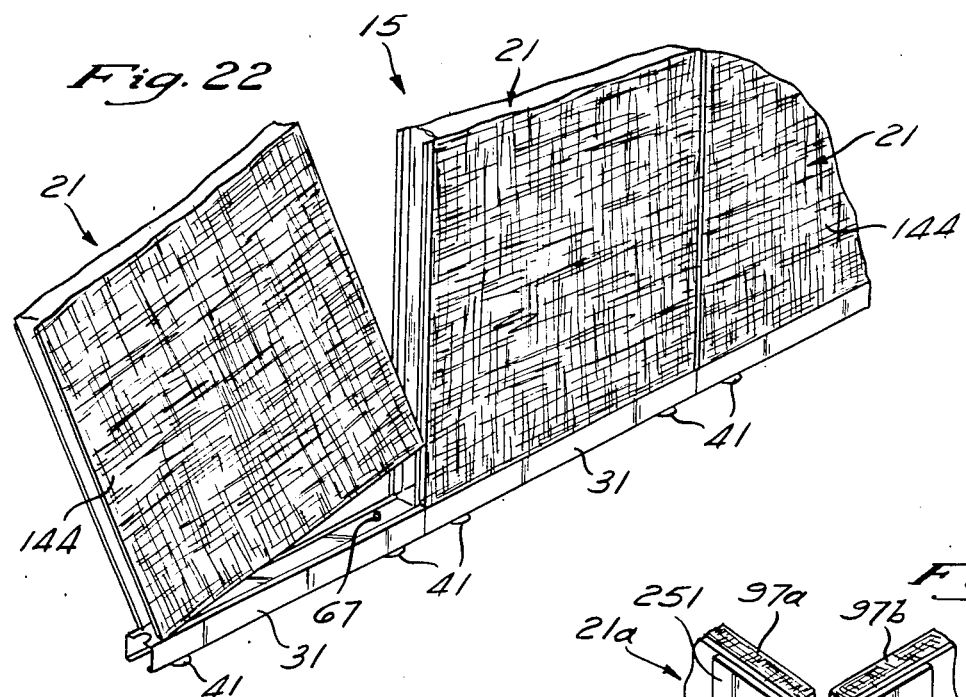
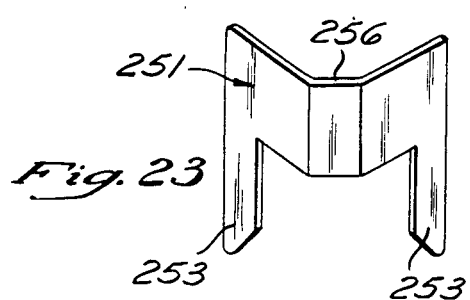
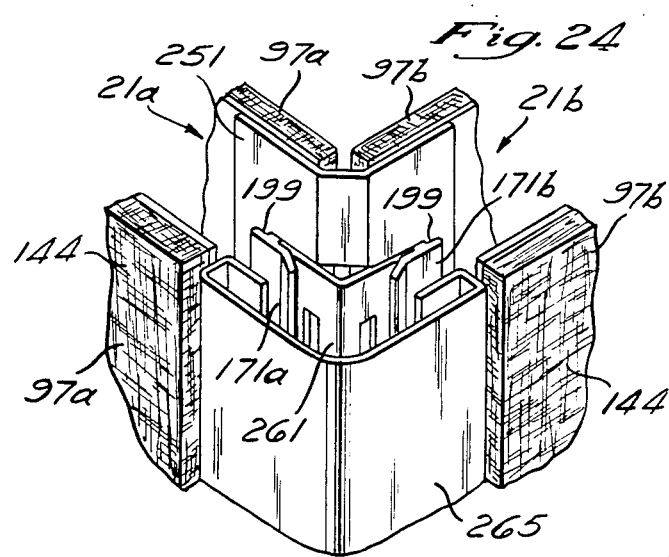
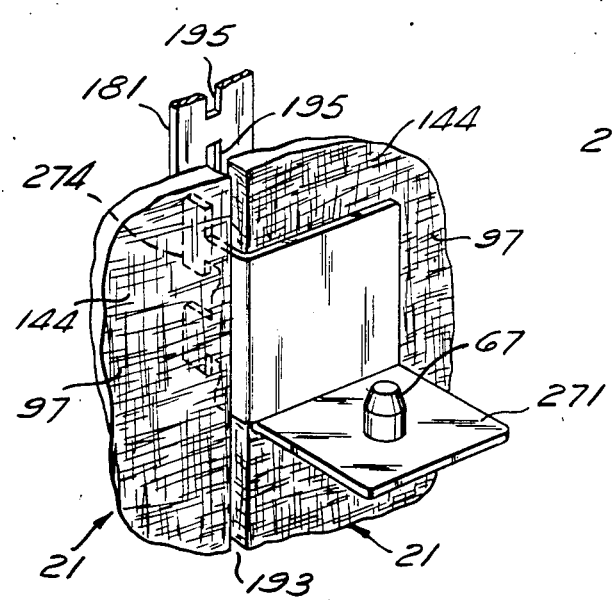

OPEN OFFICE LANDSCAPE SYSTEM

BACKGROUND OF THE INVENTION

1. Field of the Invention

The present invention relates to modular building structures, and more particularly to moveable partition systems making use of easily installed and removed modular panels to separate interior office space.

2. Description of the Prior Art

The cost of new construction has made custom-designed office space a thing of the past for most businesses. It would therefore be a goal for newer office buildings to put their available space to the maximum, beneficial use with a floor plan that could easily be altered for each change in tenant. Unfortunately, no such universal floor plan exists and remodeling costs for moving walls and electrical connections can significantly effect the rental marketability of a property.

To reduce the costs inherent in framing new interior walls and for redesigning electrical systems, the concept of temporary, modular room dividers has been developed. These temporary structures can broadly be classified into two different groups, the sound/sight panels, and the semi-permanent interior wall structures. The sound/sight panels function as little more than modernized versions of oriental privacy screens. Examples of such structures may be found in U.S. Pat. No. 3,762,116 to Anderson, et al.; U.S. Pat. No. 3,871,153 to Birum, Jr.; U.S. Pat. No. 3,788,378 to Sobel; U.S. Pat. No. 4,269,005 to Timmons; and U.S. Pat. No. 4,296,579 to Proud. Most of these panel structures simply rest upon pedestals and the like. However the more complex, such as that disclosed by Halsey, et al, U.S. Pat. No. 3,282,006 make use of springs to bias the panels between the ceiling and the floor.

As is the case for oriental screens, these panel structures are designed to provide little more than partial barriers to outside distracting sights and sounds. Even if building and fire codes permitted, these structures are not designed to provide an electrical distribution network. When the moveable partition network is being used to, in effect, re-wire the office space, a more substantial structure is required. Such electrical dividers fall in the class of semi-permanent interior walls. An example of such a construction is provided for in U.S. Pat. No. 3,195,698 to Codrea.

Regardless of the system used, all enclosed office space must be provided with light, ventilation, and access to communication/electricity. The utilities of light and ventilation are exceedingly difficult to re-route once the permanent building structure is completed. Even in the newer buildings that make use of false ceilings to house the lights and ventilation system, changing the original design will typically require a major remodeling effort, particularly with respect to ventilation. Both heat/cooling and air, must be provided through new conduits, along with new or additional outlets into the room. Frequently, an additional supply source and a supply grid is needed for the electricity or the air to respond to the greater demand for that utility. The difficulties inherent in redesigning the light and ventilation systems are one of the principal reasons that most moveable partitions and modular walls do not extend continuously from the floor to the ceiling. Most such systems stop well short of the ceiling, permitting the use of the existing light and ventilation supplies for the revised modular office space.

A standard requirement for most businesses is an adequate supply of office electrical and communication outlets. Where temporary and modular dividers are used, it becomes necessary to provide a new electrical conduit system to meet the requirements of the revised floor plan. The conduit system must be installed in a manner that satisfies local building codes, and even if otherwise permissible, esthetics alone require the new wiring system to be substantially out of view. In addition, although the conduit network must be out-of-sight and protected from the wear and tear of office life, access to the system must remain readily available for ease of maintenance and repair. Moreover, since flexibility is one of the beneficial characteristics offered by modular systems, the associated electrical system must be easily modifiable to match the subsequent changes made to the original floor plan, and these modifications must be able to be performed in a straight-forward and an inexpensive manner.

For those modular systems that provide an electrical system, the electrical pathways are provided through one of two methods. Some modular panels are true "plug-in" designs, with the individual panels pre-wired and connected to one another through electrical connectors formed as part of the panel. Such systems are shown in U.S. Pat. No. 4,270,020 to Kenworthy, et al.; U.S. Pat. No. 4,231,630 to Propst, et al.; and U.S. Pat. No. 4,239,932 to Textoris, et al.

The alternative to the "plug-in" modular systems, one that provides a greater degree of flexibility, makes use of raceways formed within the modular partitions to carry the necessary electrical and communications wires. After formation of the partitions, the wiring is placed in the most appropriate raceways to create the power grid required by the plan. An example of such a raceway system is shown in Codrea, U.S. Pat. No. 3,195,698, previously cited herein. The raceway passages permit the wiring to be placed where needed for a particular application, whereas the "plug-in" system avoids the necessity for wiring the partition subsequent to assembly. A combination of both systems is taught by Haworth, et al., in U.S. Pat. No. 4,060,294.

An additional characteristic that is important for a successful modular design is the adaptability of the design to the existing building structure. None of the moveable partitions are designed or intended to be placed into load-bearing situations, and thus the modular design must readily adapt to all of the peculiarities of the preexisting building. One of the major problems that is encountered by pre-fabricated structures is the lack of orthogonality or squareness in even the most lavishly of constructed buildings. Floors and ceilings are frequently not parallel with one-another, and in fact, may be misaligned by as much as two or three inches over the space of only several feet.

One of the more traditional methods for leveling a partition system is to provide a threaded support foot that may be turned to raise or lower the support column. Such a system is disclosed in U.S. Pat. No. 3,194,361 to Thurman. Leveling screws are also provided in Radek, U.S. Pat. No. 4,185,422, with the operation of these leveling screws apparently much like the trial-and-error method used to level many of the larger household appliances.

In addition to the problems caused by uneven floors, the multi-piece modular unit must ultimately function as a unitary structure. This requires that each of the separate pieces be connected, and although the early systems used conventional screws and bolts, one of the selling points of modular units is their ease of fabrication. The conventional forms of attachment such as screws and bolts require openings that are difficult to machine and, more importantly, increase the installation time since they must be tightened down to a certain torque level. The modular systems very quickly evolved their own attachment methods—most designed to require the minimal use of hand tools. The early systems such as Anderson, et al., U.S. Pat. No. 3,762,116, and Bleeker, U.S. Pat. No. 3,809,142, utilize peculiarly shaped connecting structures, some of them spring-loaded, to form the intermodular connections. Eventually most systems came to use some type of metal clipping arrangement, whether the Ushaped connectors of, for example, Halsey, et al., U.S. Pat. No. 3,282,006, or the more complex connecting plates of Gartung, U.S. Pat. No. 4,185,430. All of these metal plate connectors rely on the clamping force of the clip to keep the separate units together, and rely on friction to keep the metal plate connectors in place. Added security can be obtained by utilizing both metal connecting plates and bolts, such as in Timmons, U.S. Pat. No. 4,269,005.

Regardless of the type of connector used, the goal for all modular systems is to provide a method for connecting the individual units that permits the greatest amount of design freedom in selecting a floor plan. In tension with this characteristic of freedom is the requirement that the design enables the rapid installation of the modules while obtaining a structurally sound partition with rapidly installed modular units.

In addition to the physical hardware that keeps the system standing, a modular partition structure must also provide an aesthetically pleasing appearance, one that also gives the impression that the partition is structurally sound. A number of different finishing materials have been used on the modular panels from wood/-wood-veneer to particle board, plastic, and fabric.

There is a tendency for the rectangular office space created by the modular units to have very "live" acoustical characteristics, as the sound rebounds from wall to wall. Fabric wall coverings tend to dampen or diminish this effect, but present a more difficult cleaning problem than do the wood and wood-like surfaces. In addition to cleaning problems, fabric also has a tendency to fade and otherwise simply wear out over time. Many systems that use fabric covers enable the simplified removal of the covers, either by removing the entire panel, such as in Sobel, U.S. Pat. No. 3,788,378, or by removing the fabric covering, such as is shown in Decker, U.S. Pat. No. 4,112,643 and Birum, Jr., U.S. Pat. No. 3,871,153. In at least one system, Proud, U.S. Pat. No. 4,296,579, a multi-element panel is used, with all of the elements easily removed upon removal of the outer fabric covering. This ability to achieve the ultimate in tear-down characteristics, however, disadvantageously results in a panel construction having a lessened degree of structural integrity than would be the case where the fabric covering overlays an integral acoustic structure.

The market for open office systems is highly competitive with new designs and modular systems being introduced with great regularity. This rapid level of innovation is in part due to the constantly changing nature of the office environment, but the principal reason for innovation is the improvements made at many levels to the design features of modular systems.

Since the modular units are essentially all prefabricated, there is a constant effort to further reduce set-up time by reducing the need for conventional fastening systems. These efforts are complicated by the simultaneous tendency to make the unit designs more complex, and to provide a greater number of ways in which the units can be placed together.

The electrical system and the manner in which it is routed through the modular units presents a further continuing problem. Some office systems only require the most rudimentary of wiring schemes, while others require electricity and communication lines in a complex, interrelated network. Since the same modular units must be used if the partition system is going to be a viable commercial product, the modulars must provide great flexibility in the electrical design area.

A still further design problem is created where the "semi-permanent" modular systems become more or less permanent. Office requirements change over time, and the in-place units must provide the ability to respond to these changes. Access to the electrical system must be readily available—without the necessity for tearing apart large sections or, where avoidable, removing fixtures that have become attached to the modular walls. Moreover, nothing can be more out-of-date than last year's fabric styles, decorating ideas, etc. In addition, no one likes to work in areas that have become tacky or seedy due to faded or damaged walls, and the modular units must provide for both of these contingencies by having easily changed wall surfaces.

SUMMARY OF THE INVENTION

The present invention has as an underlying objective the improvement in the heretofore-known types of open office modular systems by the provision of modular units that are designed to greatly simplify the time and efforts required in constructing the systems. In addition, the modular system provides a high degree of flexibility in the routing of the electrical and communication network systems, and offers a design that enables the rapid removal and replacement of wall panels—for aesthetical or functional reasons.

This goal is inventively achieved by providing a number of innovative features to a modular system. The initial phases of construction are considerably eased and enhanced by the provision of a separate panel base system that is completely leveled prior to the placement of any panels thereupon. Office building construction over the past twenty years is notorious for the use of unleveled slabs of concrete, and aside from the structural requirements for having the modular units built on a level foundation, the aesthetics of a snaking partition with gaps and cracks between the individual units cannot be tolerated. The inter-modular unit connections are made considerably easier where the stresses and strains imposed by an unlevel system are avoided.

Connection of the modular units is further simplified under the present invention by requiring only a limited number of parts and tools to install the system. Although the layout of the individual panels may vary widely in accordance with the requirements of a particular office system, the actual method of making connections between the individual units will remain a simplified process. The previously mentioned base units are leveled and connected using only a screwdriver. The modular panels are all interconnected using metal brackets, and the wall panels or skins, and all of the trim pieces are installed by a snap-fit fastener—requiring at most only a rubber mallet. When the fabric covering is used on the wall panels, it is retained and kept taut on the wall panel by a removable elastic retention band that is seated within a peripheral groove formed along the sides of the wall panel. Thus, not only can the wall panels themselves be easily removed from the partition frame, the fabric covering can also be readily replaced with the minimum of tools and effort.

Additional improvements are also to be found in the electrical and communications network provided under the present modular system. A raceway for the various feed wires is formed along the top of the modular panels. This top raceway permits easy access to the wiring system, even after the furniture and fixtures have been installed on the wall. In addition, having the raceway at the top reduces the profile of the base since room that would otherwise be required for wiring can be used for the supportive framework. The electrical outlets within each modular panel may be provided at two separate levels, one suitable for use at a work surface elevation, and a second outlet at a higher, task lighting level. A covering panel is provided for each outlet opening, the panel both closes the inter-panel electrical raceway, and also frames the electrical and communication outlets. These electrical covering panels are easily removed when internal access to the outlets is required.

Various other objects, advantages, and features of the present invention will become readily apparent from the ensuing detailed description, and the novel features will be particularly pointed out in the appended claims.

BRIEF DESCRIPTION OF THE DRAWINGS

FIG. 1 is a perspective view showing an open office system utilizing the modular design according to the present invention;

FIG. 2 is a perspective view showing a panel base member according to the present invention;

FIG. 3 is a partial perspective view, with portions broken away, showing that portion of the panel base substantially within the circle 3 in FIG. 2;

FIGS. 4a–e are perspective views showing various connectors used in accordance with the present invention;

FIG. 5 is an exploded, partial perspective view showing a connection between two panel base members according to the present invention;

FIG. 6 is an exploded, partial perspective view showing several different types of connections between adjacent panel base members to form a panel-receiving base according to the present invention;

FIG. 7 is a perspective view of the front side of a modular electric panel according to the present invention;

FIG. 8 is a perspective view similar to FIG. 7 showing the unfinished or back side of a modular electrical panel according to the present invention;

FIG. 9 is a perspective view showing the unfinished side of a removable outer skin member according to the present invention;

FIG. 10 is a perspective view with a portion broken away showing the unfinished side of a panel cover member according to the present invention;

FIG. 11 is a perspective view with portions broken away, portions in phantom, and a portion exploded, showing the section of the panel cover member substantially within the circle 11 in FIG. 10;

FIG. 12 is a perspective view with portions in phantom and portions exploded showing a panel frame member according to the present invention;

FIGS. 13a–c are perspective views showing wood cap members according to the present invention;

FIG. 14 is a perspective view showing a communications and electrical cover plate according to the present invention;

FIG. 15 is a partial perspective view with portions broken away and portions in phantom, showing that portion of the panel frame substantially within the circle 15 in FIG. 12;

FIG. 16 is an exploded, partial perspective view with portions in phantom showing a portion of the panel frame adjacent the upper electrical raceway immediately prior to connection with an adjoining panel frame member according to the present invention;

FIG. 19 is a plan sectional view with portions omitted taken substantially along the line 19—19 of FIG. 7, showing two outer skin members received within the modular panel;

FIG. 20 is a partial side elevational view in section taken substantially along the line 20—20 of FIG. 7, showing an outer skin being received by a lower portion of the panel frame;

FIG. 21 is a partial side elevational view in section taken substantially along the line 21—21 of FIG. 7 showing a communication and electrical cover plate received by the panel frame and a communications junction box adjacent thereto;

FIG. 22 is a partial perspective view showing a modular panel being received by a panel base member according to the present invention;

FIG. 23 is a perspective view showing a 90° panel connector according to the present invention;

FIG. 24 is a partial perspective view showing a 90° connection between adjacent panel members according to the present invention;

FIG. 25 is a partial perspective view with portions in phantom showing a worktop bracket as attached to a bracket standard within a panel member according to the present invention; and FIG. 26 is a partial perspective view showing a storage bracket suitable for attaching to a bracket standard within a panel member according to the present invention.

DESCRIPTION OF THE PREFERRED EMBODIMENT

Figure 17:
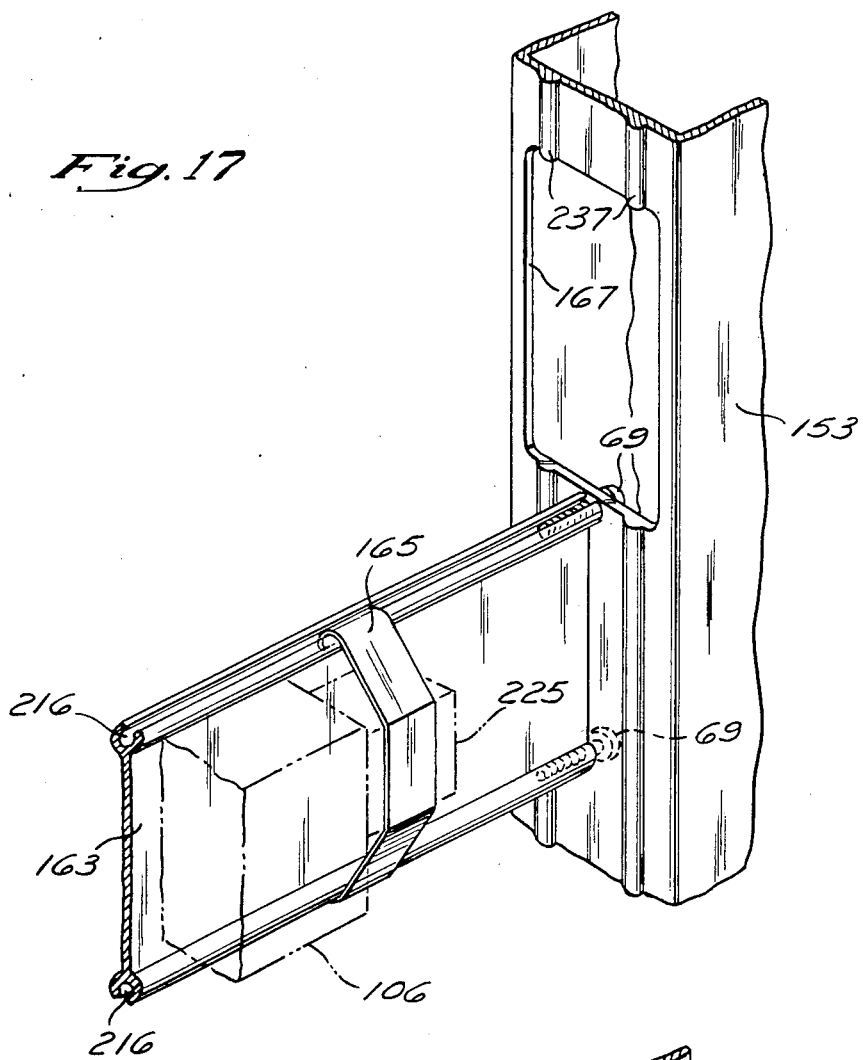
FIG. 17 is a partial perspective view with portions in phantom showing that portion of the panel frame substantially within the circle 17 in FIG. 12.

FIG. 1 shows one possible modular design for an open office system 10. This particular modular design provides four separated office spaces defined by a plurality of partitioned walls 15 placed upon a common floor 18. The surrounding external office building is not shown, but to the extent that the building design is relevant, it is relevant primarily with respect to limitations placed upon the floor plan designs that may be used, and not to the actual installation of the open office system 10, itself.

The partitioned walls 15 consist of a series of interconnected modular panels 21, with some of the modular panels 21 having been modified to form a plurality of electrical panels 23. In a typical design, the modular panels 21 far predominate over the electrical panels 23. However, this normal design is of a nature also assuring that each of the office spaces is provided with a sufficient number of electrical panels 23 to supply the required number of electrical and communications outlets.

In the preferred embodiment, the partition walls 15 do not extend continuously from the floor 18 to the ceiling (not shown), but stop a sufficient distance short of the ceiling to provide adequate ventilation to each of the office spaces using the pre-existing ventilation system. Also in the preferred embodiment, a capped, top electrical raceway 27 is formed along the top portion of the panel walls 15, and is used to carry the electrical and communication cables throughout the open office system 10. The partition walls 15 rest upon a plurality of panel receiving bases 31, which actually comprise a separate system within the open office system 10. As shown in FIG. 2, the panel receiving base 31 consists of an elongate channel member 37 of the type formed of, for example, ⅛ inch extruded aluminum. The base 31 rests upon the common floor 18 using one or more levelers 41 (two shown in FIG. 2). Even in the best of office buildings, the common floor 18 is frequently uneven, and the levelers 41 may be adjusted accordingly. As best shown in FIG. 3, the leveler 41 consists of a leveler base 44 resting against the common floor 18 (shown in phantom). A threaded leveler bolt 47 is attached to an upper portion of the leveler base 44 and is received by a leveler plate 49 attached adjacent the open channel portion of the channel member 37. In the preferred embodiment shown in FIG. 3, the leveler plate 49 is received within a pair of plate receiving channels 50 formed in the extruded elongate channel member 37. The leveler plate 49 is retained within the plate receiving channels 50 by a plurality of crimps 52 formed subsequent to the insertion of the leveler plate 49. An adjustment head 53 is formed on the leveler bolt 47 and permits an adjustment to be made regarding the distance the leveler base 44 projects beyond the leveler plate 49. Since the leveler plate 49 is attached to the elongate channel member 37, turning the adjustment head 53 raises or lowers the panel receiving base 31 relative to the common floor 18. The modular panels 21 and the electrical panels 23 are received by the panel receiving base 31 in a top base channel 59 consisting of a receiving surface 61 and a pair of opposed receiving walls 63. The receiving walls 63 prevent lateral movement of the panels 21, 23 with respect to the panel receiving base 31, and longitudinal movement is prevented by one or more projecting pins 67 placed in and projecting from the receiving surface 61. As shown in FIG. 3, a conventional screw 69 is used to retain the projecting pin 67, however, any retention means may be used for this purpose. The receiving surface 61 also has formed therein a leveling adjustment opening 71 to permit access to the adjustment head 53, facilitating adjustment of the leveler 41.

A semi-circular opening 77 is formed at each longitudinal end of the receiving surface 61 of the top base channel 59. As shown in FIG. 3, a retention means opening 79 is formed in the receiving surface 61 adjacent to the semi-circular opening 77. Although lengths of the panel receiving base 31 may differ, in a preferred embodiment, the lengths are substantially standardized. Connection of adjacent receiving bases 31 occurs in an end-to-end manner.

FIGS. 4a-e illustrate a number of different connector pieces used to attach the panel receiving bases 31 to either a further panel receiving base 31 or a terminating trim member, which is not shown, but is similar to the structure that caps the top electrical raceway 27. Each of the connecting members shown in FIG. 4 is also provided with a retention means opening 79', and each of the connecting members is of a size such that when the connecting member is properly received between the adjacent panel receiving bases 31, the base retention means opening 79 aligns with the connecting member retention means opening 79', and the connection can thereafter be completed with a conventional retention means, such as a connecting screw 81, as shown in FIG. 5.

In order to obtain the required angles between the various partition walls 15 for a specific modular design plan, the panel receiving bases 31 must be interconnected in the same ultimate pattern as are the partition walls 15. To enable the panel receiving base members 31 to be so connected, a number of different types of connecting members are utilized. Returning to FIGS. 4a-e, each has an upper connecting plate 85 that is formed in an appropriate shape to obtain the desired end relationship between the adjoining panel receiving bases 31. For example, FIG. 4b provides for a right angle connection between adjoining receiving bases 31, whereas FIG. 4c provides for a three-way connection between three adjoining receiving bases 31 (none of the receiving bases are shown in FIG. 4), FIG. 4d provides for the simple, linear connection of adjoining receiving bases 31, and FIG. 4e provides for the intersection of four receiving bases 31. FIGS. 4d and 4e also provide a central connection opening 87 therein. The central opening 87 is of a size and positioned on the connector in such a manner that with the semicircular opening 77, it forms an electrical and communication wire receiving opening in the completed panel receiving base connection, i.e., the central connection opening 87 and the semicircular opening 77 are superimposed, one over the other, when the interbase connection is completed. An example of a partial series of interconnected panel receiving bases 31 is shown schematically in FIG. 6. It can be observed that the provision of only a low number of interconnecting members enables a great variety of different floor plan designs to be made from the panel receiving bases 31.

As shown in FIGS. 7 and 8, the electrical panel 23 consists of a panel frame 93 (best shown in FIG. 12) upon which various outer covering members are placed. In the frontal view of the electrical panel 23, shown in FIG. 7, a plurality of removable outer skin members 97 are shown attached to the panel frame 93. An electrical cover plate 101 and a communications and electrical cover plate 103 are received between the outer skin members 97 and function to cover the interior electrical and communication raceways (not shown in FIG. 7). The electrical cover plate 101 is provided with an electrical outlet opening 105 that allows access to an electrical outlet placed within the previously mentioned internal electric raceway. The communications and electrical cover plate 103 is provided both with the electrical outlet opening 105 and a communications outlet 107, the latter of which permits external connections with various communications apparatus to be made with a communication wiring network 109 (only a portion of which is shown in FIG. 7) that is also placed within the interior communication and electric raceways in addition to an electric wiring network 111. The top electrical raceway 27, mentioned in connection with FIG. 1, is shown in FIGS. 7 and 8 as being covered by a wood cap member 113. Completing the external portion of the electrical panel 23, shown in FIG. 8, is a removable continuous panel skin 117, which can preferably be of an identical construction to the removable outer skin members 97, and is used to cover the rear portions of the electrical panel 23, and both front and rear portions of the modular panel 21 (not shown), since the electrical cover plate 101 and the communications and electrical cover plate 103 are not required with the modular panel 21. It should be understood that the electrical and communication cover plates 101, 103 can be placed on either or both sides of the electrical panel 23.

As shown in FIG. 9, the removable outer skin members 97 have a fabric retaining trough 123 around the outer peripheral edges, and a slab of acoustic insulation material 127 located within and surrounded by a peripheral outer border 129. The acoustic insulation material 127 is retained on the outer skin member 97 by an array of insulation receiving flanges 131. As discussed previously, the continuous panel skin 117 is constructed similarly to the outer skin members 97, and as shown in FIG. 10, the rear portion of the continuous panel skin 117 resembles a series of outer skin members attached together. A plurality of slabs of acoustic insulation material 127a are provided, each separated by a recessed border area 135, and surrounded on the remaining sides by an outer border 129a. As was the case with the outer skin members 97, the acoustic insulation material 127a is retained in place by an array of insulation receiving flanges 131a. The acoustic insulation material 127a (this is also the case with the acoustic insulation material 127 and the outer skin members 97), overlies a perforated metal plate 139, that in actuality is continuous behind the acoustic insulation material 127a and the outer and recessed border areas 129a, 135. The perforated metal plate 139 is used to provide structural integrity to the outer skin members 97 and the continuous panel skin 117. In addition, the perforations reduce the amount of weight and assist in the sound dampening qualities of the modular and electrical panels 21, 23.

FIG. 11 provides an enlarged view of one corner of the continuous panel skin 117 (and, by analogy, a corner of the outer skin member 97). As shown therein, an outer fabric covering 144 is shown received within the fabric retaining trough 123 by an elastic retaining member 147. As was mentioned previously in connection with the outer skin member 97, shown in FIG. 9, the fabric retaining trough 123 runs continuously about the periphery of the outer skin member 97, and likewise the elastic retaining member 147 extends continuously about the retaining trough 123. In a preferred embodiment, the retaining member 147 consists of a stretchable cord of neoprene rubber. Returning to FIG. 11, in addition to retaining the insulation material 127a, the insulation receiving flanges 131a are also provided with a locking flange formation 149 that enables the outer skin members 97 and the continuous panel skin 117 to be received in a snap-fit interengagement within the panel frame 93.

Support for both the outer skin members 97 and the continuous panel skin 117 is provided by the panel frame 93 shown best in FIG. 12. Comprising a rectangular framework consisting of a pair of opposed vertical support channels 153, having a vertical chase 156 formed therein, the support channels 153 are interconnected by a top raceway channel 159 at the top end and a lower panel retention channel 161 at the opposite, bottom end. Spaced between the top raceway channel 159 and the lower panel retention channel 161 are intermediate braces 163. In addition to providing structural support, the intermediate braces may conveniently be used to support the communication wiring network 109 and the electric wiring network 111 for the electrical panel 23 and have previously been referred to as the interior electric raceway when used in this mode. As shown in FIG. 12, both the communications wiring network 109 and the electric wiring network 111 can easily be attached to the intermediate braces 163, as can the electric outlet 106 and the communications outlet 107. In the embodiment shown in FIG. 12, a pair of metal retaining brackets 165 are used to support and place the electric outlets 106 on the intermediate braces 163. A plurality of openings 167 are formed in the vertical support channels 153 adjacent the intermediate braces 163 to enable the communication wiring network 109 and the electric wiring network 111 to pass from the vertical chase 156 to the intermediate braces 163. The vertical chase 156 interconnects with the top electrical raceway 27 to allow the passage of the communication wiring network 109 and the electric wiring network 111 therethrough.

A T-flange 171 is formed on each of the vertical support channels 153, adjacent the outer openings of the vertical chase 156. The T-flange 171 substantially extends the length of the vertical support channels 153 and is used to form the interconnections between the panel frames 93. The vertical support channels 153, the top raceway channel 159, and the lower panel retention channel 161 are all preferably constructed of extruded aluminum.

As also shown in FIG. 12, a pair of slotted standards 181 are shown adjacent the vertical support channels 153. The slotted standards 181 are received within a channel formed by two adjacent T-flanges 171 when there is a connection between the vertical support channels 153 of adjoining panel frames 93. This entire relationship is best shown, and will be described hereinafter, in connection with FIGS. 15 and 16.

The remaining figures, FIGS. 13 and 14, on sheet 4 of the drawings illustrate various finishing features that are applied to the panel frame 93. In FIGS. 13a–c, the wood cap member 113 is shown in three different embodiments. A lateral wood cap 113a is shown in FIG. 13a and is provided with a pair of snap-lock members 185 that are sized to be received and retained by the sides of the top electrical raceway 27. A linear interconnecting wood cap member 113b and a 90° interconnecting wood cap member 113c are also provided with snap lock members 185 (not shown) and each of these latter wood cap members 113b, 113c are received by the top flange portion of the vertical support channels 153 and interconnected with an adjacent vertical support channel. The various cap members may, of course, be fabricated of any number of different materials, however, wood and simulated wood provides an aesthetically pleasing appearance. The communications and electrical cover plate 103 is shown in isolation by FIG. 14, and includes the communications outlet 107 and the electrical outlet opening 105. An outer flange 189 is formed along each lateral edge of the cover plate 103, and abuts against the outside peripheral surface of the outer border 129 of the outer skin members 97. The cover plate 103 is thus retained in place between the adjacent outer skin members 97. The electrical cover plate 101 is similarly held in place between the adjacent skin members 97, and differs from the communications and electrical cover plate 103 shown in FIG. 14 only by the omission of the communications outlet 107 from the electrical cover plate 101.

The interconnection between adjacent modular and electrical panels 21, 23 forms the partition walls 15. The interconnections are best described by reference to FIGS. 15 and 16. Reference numerals for the identical, corresponding structures will be kept identical, with the addition of an "a" and a "b" to correspond to their respective panel. For the sake of simplicity, the interconnection is deemed to be between two adjacent modular panels 21a, 21b, however, the same interconnections will exist as between two electrical panels or the interconnection between an electrical panel and a modular panel.

When placed adjacent one another, the T-flanges, 171a, 171b of the vertical support channels 153a, 153b form a receiving slot suitable for receiving and retaining the slotted standards 181. As shown by FIG. 15, the adjacent vertical support channels 153a, 153b do not abut against one another, but rather form an access opening 193 that extends the entire length of the vertical support channels 153a, 153b. The access opening 193 enables various hooking members to extend into from the outside and engage with anyone of a plurality of slots 195 formed in the slotted standard 181. In this manner various brackets and similar devices as will subsequently be described, may be attached to and supported by the vertical support channels 153a, 153b through the use of the slotted standards 181.

In addition to receiving the slotted standards 181, the T-flanges 171a, 171b of the respective panel members when brought adjacent to one another, provide two parallel, laterally extending flange grooves 199 that are used to form the mechanical interconnection between the adjacent modular panels 21a, 21b. A connecting clip 203 is provided with a pair of extending clip arms 207, the connecting clip 203 and the pair of clip arms 207 are sized so as to be received by the T-flanges 171a, 171b. When connecting the adjacent modular panels 21a, 21b, after bringing them in close proximity to one another, and after the slotted standards 181 have been put in place, the extending clip arms 207 of the connecting clip 203 are slidably received along the flange grooves 199a, 199b of the adjacent pair of T-flanges 171a, 171b. The connecting clip 203 is preferably inserted fully onto the pair of T-flanges 171a, 171b, and in the preferred design shown in FIG. 15, a top clip edge 209 is substantially adjacent the top edge 210a, 210b of the respective vertical support channels 153a, 153b. When fully inserted, the clip arms 207 extend their full length down the flange grooves 199a, 199b, and the connecting clip 203 rests upon the top edge of the web members 211a, 211b of the T-flanges 171a, 171b. To ensure the continuity and soundness of this interconnection, the connecting clip 203 and the T-flanges 171a, 171b are dimensioned such that the connecting clip 203 is snugly received by the T-flanges 171a, 171b, relying on frictional forces to prevent the connecting clip 203 from backing out of the flange grooves 199a, 199b.

FIGS. 15 and 16 also show the preferred manner of connecting the top raceway channels 159a, 159b to their respective vertical support channels 153a, 153b. As shown in the figures, a plurality of conventional screws 69 are used to retain the top raceway channels 159a, 159b on the vertical support channels 153a, 153b. A plurality of tapping grooves 216a, 216b are formed in the top raceway channels 159a, 159b, and receive the retaining screws 169.

A raceway opening 219a, 219b is formed in each of the vertical support channels 153a, 153b adjacent the connection between the vertical support channels 153a, 153b and the top raceway channels 159a, 159b. The raceway openings 219a, 219b enable communication and electrical wiring (not shown) placed within the various raceways to pass through the connection, and, where desired, be routed between the top electrical raceway 27 and the vertical chase 156 (neither reference numeral shown on either FIGS. 15 or 16).

A close-up of the connection between the intermediate brace 163 and the vertical support channel 153 is shown in FIG. 17. As was the case in connecting the top raceway channel 159 to the vertical support channel 153, shown in FIGS. 15 and 16, many different connecting systems could be used, but a preferred connection is the use of conventional metal screws 69 received within tapping grooves 216 formed along both lateral edges of the intermediate brace 163. The tapping grooves 216 also receive and retain the metal retaining brackets 165 used to hold the electric outlet 106 in place on the intermediate brace 163. As shown in FIG. 17, the metal retaining bracket is placed against a portion of the electric outlet 106, and in the preferred embodiment this smaller portion is an outlet plug 225 suitable for forming the connection between the electric outlet 106 and the electric wiring network 111 (not shown).

Figure 18:
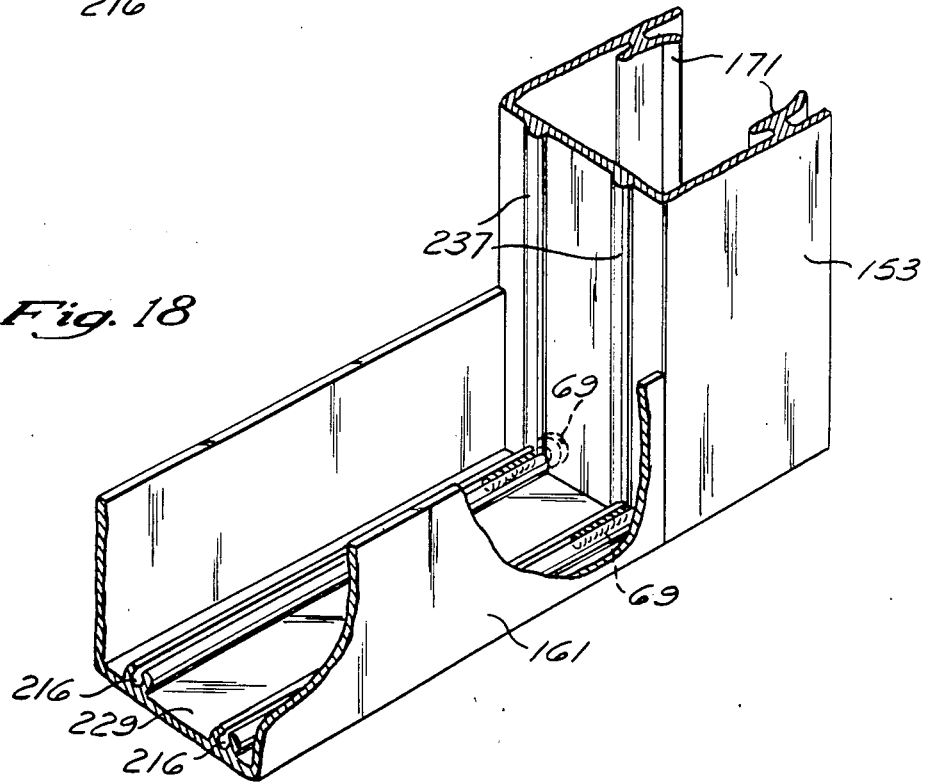
FIG. 18 is a partial perspective view with portions broken away and portions in phantom showing that portion of the panel frame substantially within the circle 18 in FIG. 12.

The connection between the lower panel retention channel 161 and the vertical support channel 153 is shown in FIG. 18. As was the case with the connections between the vertical support channel 153 and the top raceway channel 159 and the intermediate brace 163, a preferred method for forming this connection is the use of conventional metal screws 69 received by the tapping grooves 216 formed in the member to be connected to the vertical support channel 153. In the case of the lower panel tension channel 161, the tapping grooves 216 are formed in a panel floor 229 of the tension channel 161. Although not shown in FIG. 18, the channel floor 229 also has one or more apertures formed therein of a size suitable to be received by the projecting pins of the panel receiving base 31. In this manner, the modular panel 21 and the electrical panels 23 are received and retained by the panel receiving base 31, as shown in FIG. 22.

FIG. 19 illustrates the primary method by which the outer skin members 97 and the continuous panel skin 117 are retained upon the panel frame 93. For purposes of illustration, one of the coverings in FIG. 19 will be identified as the outer skin member 97 and the other covering will be identified as the continuous panel skin 117. As will be seen, for purposes of explaining the method of connection to the panel frame 93, it is immaterial whether the covering is an outer skin member or a continuous panel skin member. The outer skin member 97 is received within the panel frame 93 between the opposing vertical support channels 153a, 153b of the panel frame 93. A pair of locking ridges 237a, 237b are formed in both of the vertical support channels 153a, 153b and receive the locking flange formation 149a, 149b of the insulation receiving flanges 131 attached to the outer skin members 97. The locking ridges 237a, 237b and the locking flange formations 149 cooperate to retain the outer skin member 97 (or analogously, the continuous panel skin member 117), in a snap-fit type of connection.

FIG. 19 also illustrates the various layers of the outer skin members 97 and the continuous panel skin members 117. The outer fabric covering 144 is used to enhance the esthetic appearance of the outer skin members 97, and overlies an inner insulation pad 231, which, like the acoustic insulation material 127, is preferably placed therein to absorb sound energy generated within the office space. Structural integrity of the outer skin member 97 is provided by the perforated metal plate 139.

The attachment of the outer skin members 97 (or the continuous panel skin members 117) to a second portion of the panel frame 93 is shown in FIG. 20. In this particular instance, the outer skin member 97 is shown being received by the panel receiving base 31 adjacent to the lower panel tension channel 161. However, when the outer skin member 97 is adjacent to the top raceway channel 159, a similar structure can be provided to retain that upper outer skin member in a similar fashion. According to this method of attachment, a skin receiving ridge 63 is formed along the top base channel 59 of the panel receiving base 31. The fabric retaining trough 123 is received by the skin receiving ridge 63 and assists in the retention of the outer skin member 97 to the panel frame 93. FIG. 20 also illustrates the manner in which the lower panel retention channel 161 is received by the projecting pin 67 of the panel receiving base 31.

The manner in which the communications and electrical cover plate 103 (and by analogy the electrical cover plate 101) are received between two adjacent outer skin members 97 is illustrated by FIG. 21. The outer skin members 97 are shown as in place and retained by the panel frame 93. The outer flanges 189 of the cover plate 103 are received by flat surfaces formed along the top edges of the fabric receiving trough 123. The cover plate 103 can thus be easily removed when access to the underlying electrical or communications system is required.

The modular panel 21 is shown in FIG. 22 as being installed onto the connected panel receiving base 31, forming the partition wall 15. As mentioned previously, the modular panel 21 (and the electrical panel 23, not shown) are received upon the panel receiving base 31 by projecting pins 67 (one shown). An important feature of this present system is the leveling of the panel receiving base 31 prior to the insertion of any modular panels 21. The levelers 41 are easily vertically adjusted prior to insertion of the modular panels 21, and leveling can proceed in a straight forward, known manner. This is a non-linear world, and frequently it is desired to have the partition walls 15 make corners. Although the present system is not limited to 90° corners, and other angles may be provided between adjacent modular panels 21, for purposes of illustration, FIGS. 23 and 24 will be referred to in connection with a 90° corner. A 90° connecting clip 251 is shown in FIG. 23, and is much the same structurally as the connecting clip 203 described in connection with FIGS. 15 and 16. The 90° clip 251 is provided with a pair of projecting clip arms 253 that are perpendicular to one another due to an angular section 256 provided in the 90° connecting clip 251. Referring to FIG. 24, the 90° connecting clip 251 is shown connecting two adjacent modular panels 21a, 21b placed at a 90° angle to one another. As was the case with the connecting clip 203, the 90° connecting clip 251 is received by the flange grooves 199 in the adjacent T-flanges 171a, 171b. A 90° slotted standard 261 is also received by the internal grooves of the flanges 171a, 171b, as was the case with the slotted standards 181. Completion of the 90° connection makes use of a corner post 265 extending between the outer walls of the adjacent modular panel 21a, 21b. The corner post 265 is connected to each of the modular panels 21a, 21b by the straight connecting clips 203, making use of the T-flange members and a corresponding flange groove formed in the corner post 265 (not shown). As was the case in straight connections, a slotted standard 181 is also placed between the modular panel 21a and the corner post 265, within the T-flange 171 and a corresponding structure on the corner post 265.

The slotted standards 181, as was discussed previously, may be used to support various brackets in a conventional manner. As shown in FIGS. 25 and 26, a first storage bracket 271 and a second storage bracket 273 are provided. Both of the storage brackets 271, 273 have formed thereon a slot engaging structure 274, which can be inserted between adjacent modular panels 21 (or adjacent electrical panels 23, or adjacent modular panel 21 and electrical panel 23) to engage with the slots 195 formed in the slot standard 181. The first storage bracket 271 is of a type having been provided with the projecting pin 67 for engagement with another structure such as a work surface (not shown) having a suitable aperture formed in a bottom surface therein for receiving the projecting pin 67. The second storage bracket 273 is of the type having an arm formed thereon for engaging with a structure having a bracket engaging means (not shown). Of course various other storage brackets with different engaging means, but having the slot engaging structures 274 formed thereon, may be used to attach a multitude of different objects to the partition walls 15.

While I have disclosed an exemplary structure to illustrate the principals of the present invention, it should be understood that I wish to embody within the scope of the patent warranted hereon, all such modifications as reasonably and properly come within the scope of my contribution to the art.

I claim:

1. An open office partition system comprising:
   a panel receiving base having means for leveling a panel receiving channel of said receiving base and having a plurality of projecting pins formed in said panel receiving channel;
   a partition wall received upon said projecting pins formed in said panel receiving channel attaching said partition wall to said receiving base, said partition wall consisting of a plurality of modular panels, each of which comprises:
   a lower panel retention channel having a first and a second end,
   a first vertical panel wall support channel attached to and extending from said first end of the lower panel retention channel,
   a second vertical panel wall support channel attached to and extending from said second end of the lower panel retention channel, said first and said second vertical support channels each having a laterally open vertical chase formed therein,
   a top raceway channel attached to and connecting said first and said second vertical support channels at the extending end thereof, said raceway channel having an open top electrical raceway formed therein, at least one intermediate brace attached to and extending from said vertical support channel to said second vertical support channel, and an outer panel covering attached to the channel members forming an outer skin for the modular panel;

a plurality of connection clips for connecting vertical support channels of adjacent modular panels at preselected angles with respect to one another such that said laterally open vertical chases form closed vertical passageways between adjacent panels, the modular panels connected in a manner maintaining the continuity of said open raceway channel permitting an electrical network to be retained therein; and an electrical network received within at least a portion of said top electrical raceway and said vertical chase, whereby a continuous electrical network may be created as part of the partition wall by the selective placement of the modular panels, and said wall placement may proceed subsequent to a leveling of the base receiving channel.

2. An open office system as described in claim 1, wherein the partition wall further comprises:

a selected number of electrical panels, the number dependent upon the electrical requirements for the particular office partition system, said electrical panels consisting of modifications to said modular panels, wherein an electric outlet is attached to said intermediate brace, with means for outside access to said outlet through said outer panel covering and for connecting the electric outlet to said electrical network provided.

3. An open office system as described in claim 2, wherein an opening is provided in said vertical support channel adjacent the intermediate brace bearing the electric outlet, providing access to the electrical network through said vertical chase.

4. An open office system as described in claim 3, and further comprising:

a communications outlet attached to said intermediate brace;

a communicating network receiving within at least a portion of said top electrical raceway and vertical chase;

means connecting said outlet with said communicating network; and means for outside access to the communications outlet through said outer panel covering.

5. An open office partition system as described in claim 4, wherein said outer panel covering consists of at least one skin member received by the channel members and comprising:

an outer border having a fabric-retaining trough formed about the periphery thereof;

an outer fabric covering overlying said outer border and received within said fabric retaining trough;

a stretchable cord selectively received within said fabric retaining trough, retaining said outer fabric covering therein, and maintaining said fabric in taut interengagement with said outer border;

acoustic insulation means attached to the panel covering on an inside surface thereof; and means connecting said skin member to the channel members.

6. An open office partition system as described in claim 4, wherein said acoustic insulation means comprises an acoustic insulation material received within insulation receiving flanges formed in said skin member, and said means connecting said skin member to the channel member comprises:

a locking flange formed as part of said insulation receiving flanges, and a locking ridge formed on said vertical support channel sized to receive and engage with said locking flange in a snap-fit locking arrangement.

7. An open office partition system as described in claim 5, wherein said means for outside access to the electric outlet and the communications outlet comprises a communications and electrical cover plate that forms part of said outer panel covering.

8. An open office partition system as described in claim 7, wherein said outer panel covering includes three skin members with one of said cover plates received between adjacent skin members.

* * * * *